June 22, 1943.  DE WITT D. MERRICK  2,322,378
CABLE STRUCTURE
Filed Oct. 3, 1941
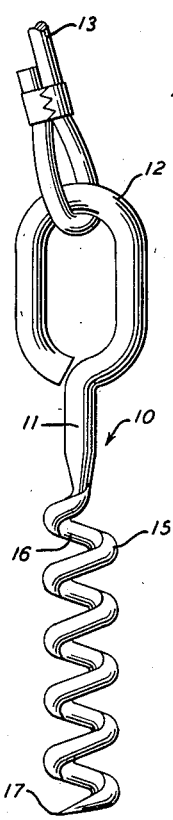
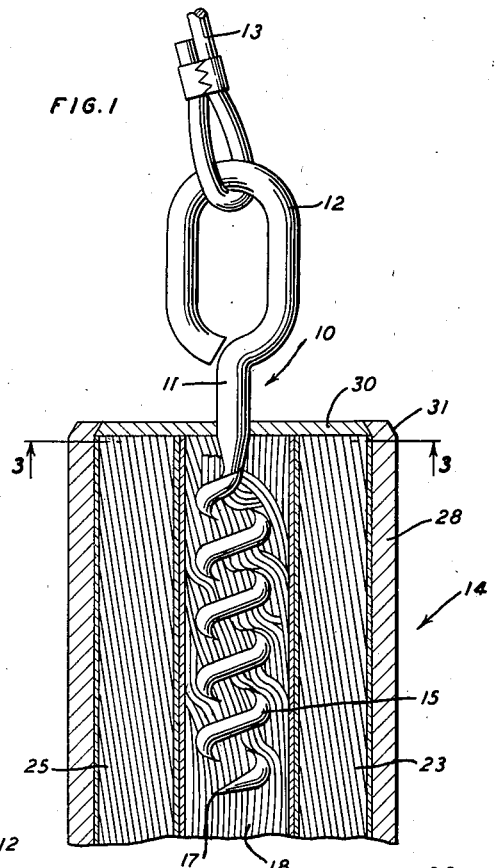
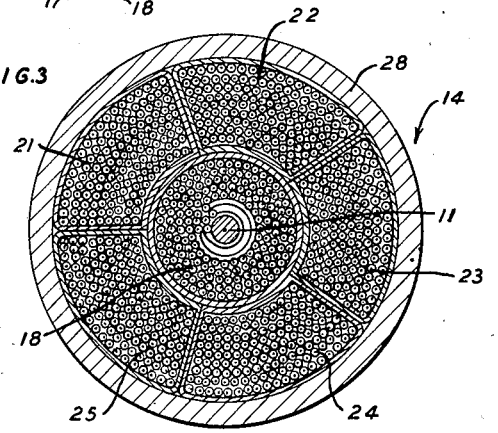
INVENTOR
D. D. MERRICK
BY
E. R. Nowlan
ATTORNEY Patented June 22, 1943

2,322,378

UNITED STATES PATENT OFFICE 2,322,378

CABLE STRUCTURE

De Witt D. Merrick, Cranford, N. J., assignor to Western Electric Company, Incorporated, New York, N. Y., a corporation of New York Application October 3, 1941, Serial No. 413,417

6 Claims. (Cl. 24—123)

This invention relates to cable structures and more particularly to cable structures used in transmitting intelligence electrically, with pulling elements.

In armoring a cable sheathed in lead or other similar material, the cable in some instances must be pulled through the armoring machine. This may be done by securing a pulling strand to the end of the cable. With cables having thick sheaths the strands may be secured to the sheaths through rings soldered in the ends of the sheaths. However, with cables having thin sheaths, difficulties arise if the sheaths support the entire pulling force required to thread the cable through the armoring machine.

An object of the invention is to provide a cable structure with a pulling element so positioned in the end thereof that pulling force on the element will be distributed to the various parts of the cable structure.

With this and other objects in view, one embodiment of the invention comprises a cable structure including a group of twisted strands enclosed in a sheath and having a pulling element with a helical portion disposed among the strands and connected thereto, so as to distribute the holding force among the helical portion, the strands and sheath when a pulling force is applied to the element.

Other objects and advantages will be apparent from the following detailed description taken in conjunction with the accompanying drawing, wherein Fig. 1 is a vertical sectional view of the cable structure with the pulling element shown in elevation;

Fig. 2 is a side elevational view of the pulling element, and

Fig. 3 is a sectional view taken along the line 3—3 of Fig. 1.

Referring now to the drawing, it will be observed that a pulling element of the cable structure has a body 10, a central portion 11 of which is straight and circular in cross section. The upper portion of the body is formed into a loop 12 for use in manually rotating the element for its assembly in the cable structure and for use in connection with a strand 13 for pulling the cable structure, for example, through an armoring machine. A cable portion is indicated generally at 14.

The remaining portion of the body 10, which portion is indicated at 15, is of helical contour, this portion having an inner diameter which is equal throughout, forming a cylindrical contour of flat aligned walls 16 of the various turns or convolutions of the portion. The outer surfaces of the portion 15, that is of the various convolutions, are of equal dimensions, forming a cylindrical outer contour, the outer surfaces, however, being arcuate in cross section. The extreme end of the portion 15 comes to a point as at 17, the walls thereadjacent tapering gradually to the full thickness as illustrated in Fig. 2. The contours of the helical portion 15 as well as the walls 16 are of utmost importance in the assembly thereof with the remaining portion of the cable structure.

The cable portion 14 is in the present embodiment formed of six cable units 18, 21, 22, 23, 24 and 25. These cable units are each formed of a group of strands, for example, electrical conductors, individually insulated, the strands in each group being twisted together and held in the twisted positions by suitable means, such as one or more wrappings of paper or the like. In the present illustration the unit 18 forms a central core about which the other units are twisted. These twisted units may, if desired, be secured together by suitable means such as strands or wrappings of paper or the like. The units thus prepared are then passed through an extruding press (not shown) and there provided with a sheath of suitable material such as lead antimony.

The thickness of the sheath may vary and in some instances, where the sheath is required to be thin, the sheath in itself will not have sufficient strength to withstand a pulling force necessary to pull the cable structure through an armoring machine. However, if the pulling force were distributed throughout the cross sectional area of the cable portion, the cable could be threaded through an armoring machine without possible damage to any portion of the cable structure. With the pulling element as a part of the cable structure this is made possible.

The pulling element is made a part of the cable structure by placing it in central alignment with the cable portion and applying suitable force on the loop portion 12 while simultaneously applying rotary movement thereto. As the point 17 enters the cable portion it will travel between the conductors, encircling one group of conductors during one cycle and then, due to the spiral or twisted formation of the conductors, the point will leave out certain of the previously selected conductors and pick up other conductors, as illustrated in Fig. 1. In this manner various groups of conductors are disposed in the cylindrical interior of the helical portion 15, while those entering and leaving the said interior extend between the convolutions.

When the element is in the position shown in Fig. 1 it surrounds various groups of conductors and is thus more firmly connected to several more conductors than could be received in the cylindrical interior of the portion 15 should the conductors be straight instead of being twisted. The portion 15 also adds an equal quantity of material throughout the length thereof to the material of the cable portion, effecting an internal pressure in the cable outwardly toward the sheath and naturally inwardly toward the helical portion, to distribute the effect of the connection, between the cable and the element, throughout the area of the cable portion adjacent the element.

After the element is disposed in place in the cable portion, the end of the cable portion is closed by lead or solder 30, the end of a sheath 28 being bent inwardly as at 31, providing a bevelled end to assist in the threading of the cable structure. The cable structure may then be threaded through an armoring machine or pulled for any other desired reason, the pulling force being distributed throughout the cross sectional area of the cable structure and not being applied to a small portion thereof.

The embodiment of the invention herein disclosed is merely illustrative and may be widely modified and departed from in many ways without departing from the spirit and scope of the invention as pointed out in and limited solely by the appended claims.

What is claimed is:

1. A cable structure comprising a unit formed of a plurality of twisted strands, a sheath disposed on the unit, and a pulling element including a helical portion positioned in the sheathed unit and extending around a group of the strands forming a connection between the unit and the element.

2. A cable structure comprising a unit formed of a plurality of twisted strands, a sheath disposed on the unit, and a pulling element including a helical portion having a plurality of turns positioned in the sheathed unit with the turns extending around varied groups of the strands to form a connection between the unit and the element.

3. A cable structure comprising a unit formed of a plurality of twisted strands, a sheath disposed on the unit, and a pulling element including a helical portion of predetermined thickness positioned in the sheathed unit and extending around a group of the strands forming a connection between the unit and the element, the positioning of the helical portion in the sheathed unit effecting lateral holding pressure therebetween.

4. A cable structure comprising a unit formed of a plurality of twisted strands, a sheath disposed on the unit, and a pulling element including a helical portion of uniform thickness positioned in the sheathed unit and extending around a group of the strands forming a connection between the unit and the element, the positioning of the helical portion in the sheathed unit effecting uniform lateral holding pressure therebetween.

5. A cable structure comprising a unit formed of a plurality of twisted strands, a sheath disposed on the unit, and a pulling element including a helical portion having a plurality of turns positioned in the sheathed unit with the turns extending around varied groups of the strands to form a connection between the unit and the element, the positioning of the helical portion in the sheathed unit effecting uniform lateral holding pressure therebetween.

6. A cable structure comprising a unit formed of a plurality of twisted strands, a sheath disposed on the unit, and a pulling element including a helical portion having a plurality of turns positioned in the sheathed unit with innermost turn surrounding a group of the strands and the other turns surrounding other groups of the strands to form a connection between the unit and the element.

DE WITT D. MERRICK.